July 23, 1940.        R. M. SPENCER        2,208,706
HOSE CLAMP
Filed Jan. 4, 1939
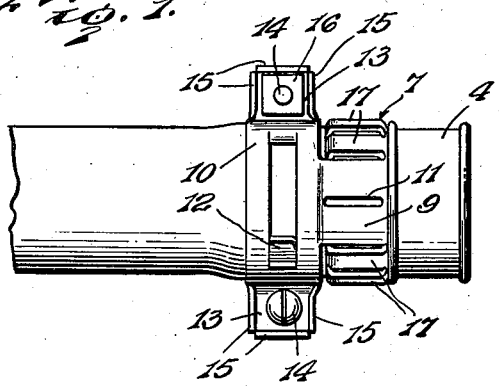
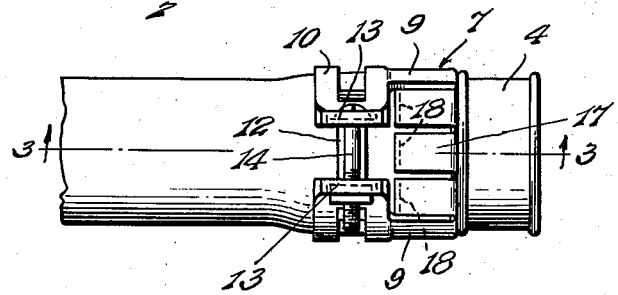
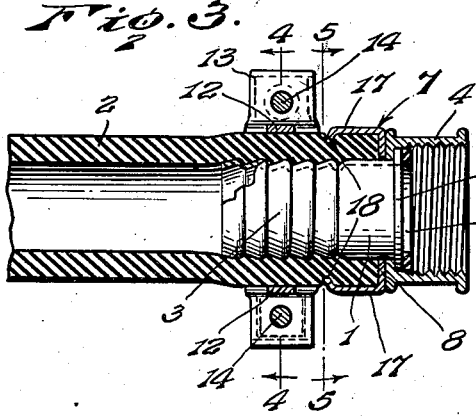
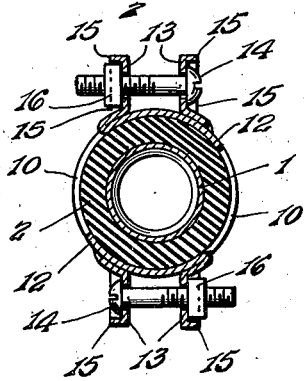
Inventor
R. M. Spencer.
By Lacey & Lacey
Attorneys Patented July 23, 1940

2,208,706

UNITED STATES PATENT OFFICE 2,208,706

HOSE CLAMP

Raphael M. Spencer, Moscow, Idaho

Application January 4, 1939, Serial No. 249,287

2 Claims. (Cl. 285—84)

This invention relates to a hose clamp, and it is one object of the invention to provide a device of this character adapted to be used in connection with a coupling which fits into the hose, the clamp being so constructed that it includes claws adapted to be bent into tight clutching engagement with the hose and also a pair of jaws having bolts associated therewith to draw the jaws tightly about the hose into a gripping position. It will thus be seen that a hose will be engaged by clamping jaws as well as by claws and likelihood of the hose slipping will be eliminated.

Another object of the invention is to provide a clamp which may be readily applied to a sleeve adapted to be fitted into abutting ends of hose sections or to a sleeve carrying a threaded coupling member which may be rotatable about the sleeve and constitute means for connecting hose with a faucet.

Another object of the invention is to provide a coupling including claws and gripping jaws, the coupling being of such formation that it may be formed from a blank of metal having portions bent to form the jaws for engaging about the hose and other portions bent to form claws disposed between the jaws and adapted to be bent into position to firmly clutch the hose by striking the claws with a hammer or other driving implement.

Another object of the invention is to provide a hose clamp which is quite simple in its construction, cheap to manufacture and very easy to apply.

The invention is illustrated in the accompanying drawing, wherein:

Figure 1 is a view in elevation showing the improved clamp applied to a hose in connection with a faucet-engaging terminal of the hose, Figure 2 is a view in elevation with the hose and clamp turned one-fourth of a revolution from the position shown in Figure 1, Figure 3 is a sectional view taken longitudinally through the hose and clamp along the line 3—3 of Figure 2, Figure 4 is a transverse sectional view taken along the line 4—4 of Figure 3, and Figure 5 is a sectional view taken along the line 5—5 of Figure 3.

The improved coupling constituting the subject-matter of this invention is used in connection with a sleeve 1 which is adapted to fit within an end portion of a rubber hose 2 and is corrugated circumferentially, as shown at 3, to provide a good gripping engagement between the hose and the sleeve which fit tightly into the hose. In the present illustration the sleeve projects slightly from the hose and carries a collar 4 which is internally threaded for engagement with an outlet faucet, a circumferentially extending flange 5 being provided about the outer end of the sleeve to hold the collar 4 in place thereon and provide an abutment shoulder for the hose washer 6. The sleeve and collar are of a conventional construction, and it is to be understood that the improved coupler could be used in connection with other types of sleeves employed for connecting abutting ends of hose sections.

The coupler or clamp, which is indicated in general by the numeral 7, is formed of strong bendable metal and has a body including an annular flange 8 which fits about the sleeve 3 and against the end of the hose 2, as shown in Figure 3. Arms 9 extend from the flange 8 longitudinally of the hose and sleeve 1 and at their ends the arms carry cross-heads or jaws 10 for extending circumferentially of the hose. The arms 9 are slotted longitudinally, as shown at 11, in order that they may be bent transversely to conform to the curvature of the jaws and the hose and the cross-heads or jaws are cut longitudinally to provide tongues 12 which are bent back upon themselves inwardly of the jaws. These tongues project from ends of the jaws, as shown in Figure 4, and upon referring to this figure, it will be seen that each jaw has a tongue extending from one end thereof in bridging relation to the adjacent end of the other jaw between the end portions or ears 13 of the two jaws which project outwardly from the hose at opposite sides thereof and are perforated to receive the bolts 14. Each jaw has an end portion overlapping the free end of the tongue of the other jaw and, therefore, when the bolts are tightened, the jaws may be drawn very tightly about the hose for gripping engagement therewith without end portions of the jaws catching against portions of the hose and failing to have tight binding engagement with the hose. Marginal portions of the ears are bent to form flanges 15 for engagement with the nuts 16 and the flanges 15 will thus serve as locking means to prevent the nuts from accidentally loosening after the bolts have been tightened.

Between the arms 9 are provided claws 17 which extend longitudinally of the clamp and have their free ends bent to form teeth 18 for biting into the hose, as shown in Figures 3 and 4, when the claws are bent into clutching engagement with the hose through the medium of a hammer or other driving implement. It will thus be seen that, when this clamp is in use and the sleeve 1 is forced into the hose, the jaws may be tightened about the hose and the claws bent into firm gripping engagement therewith. The clutching action of the claws 17 and the binding action of the jaws will serve very effectively to prevent movement of the clamp longitudinally or cimcumferentially of the hose and the fact that the jaws grip and compress the hose will cause it to be constricted for tight binding engagement with the ribbed portion 3 of the sleeve 1 and prevent any danger of the sleeve working longitudinally out of the hose. When it is desired to remove the clamp, it is merely necessary to loosen or entirely remove the bolts 14 and then pry the claws out of clutching engagement with the hose. The clamp and the sleeve can then be withdrawn from the hose.

Having thus described the invention, what is claimed as new is:

1. A hose clamp comprising a blank of bendable metal having a circular intermediate portion forming an annular inwardly extending hose-engaging flange, arms formed integral with said flange and extending longitudinally from the outer periphery of the flange, transversely disposed hose-gripping jaws formed integral with front ends of said arms and provided with slots, the material between the walls of the slots being bent laterally to form clamping tongues, said jaws extending circumferentially of the clamp from opposite sides of the arms and having their ends bent to form outstanding ears, bolts passing through said ears for drawing the jaws about a hose and the clamping tongues in engagement with the hose between said ears, and sets of claws formed integral with and extending forwardly from the outer periphery of said flange between said arms and having their free ends bent inwardly to form teeth adapted to bite into the hose adjacent said gripping jaws.

2. A hose clamp comprising a body of bendable metal having an annular inwardly extending hose-engaging flange at its inner end, sets of claws formed integral with and extending forwardly from said flange and provided with terminal inwardly extending teeth adapted to bite into a hose, slotted clamping members disposed in front of the free ends of said claws transversely thereof, spaced outwardly projecting ears formed on the clamping members, mounting arms extending between the sets of claws and integrally united to the flange, the material between the slots of the clamping members being bent laterally to form clamping tongues adapted to engage a hose between adjacent ears, and means extending through said ears for securing said clamping members tightly about a hose in front of the claws.

RAPHAEL M. SPENCER.